United States Patent
Zhu

(10) Patent No.: US 12,438,628 B2
(45) Date of Patent: Oct. 7, 2025

(54) BEAM RECEIVING METHOD AND APPARATUS, ELECTRONIC DEVICE, AND COMPUTER-READABLE STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 412 days.

(21) Appl. No.: 18/000,354

(22) PCT Filed: Jul. 17, 2020

(86) PCT No.: PCT/CN2020/102800
§ 371 (c)(1),
(2) Date: Nov. 30, 2022

(87) PCT Pub. No.: WO2022/011708
PCT Pub. Date: Jan. 20, 2022

(65) Prior Publication Data
US 2023/0198643 A1    Jun. 22, 2023

(51) Int. Cl.
*H04B 17/318* (2015.01)

(52) U.S. Cl.
CPC .................. *H04B 17/318* (2015.01)

(58) Field of Classification Search
None
See application file for complete search history.

(56) References Cited

U.S. PATENT DOCUMENTS

| | | | |
|---|---|---|---|
| 11,770,721 B2* | 9/2023 | Li | H04W 56/001 370/329 |
| 2013/0051187 A1 | 2/2013 | Matsuzaki et al. | |
| 2020/0119839 A1* | 4/2020 | Jo | H04L 1/0047 |
| 2020/0178137 A1* | 6/2020 | Hassan Hussein | H04W 36/00837 |
| 2021/0400462 A1* | 12/2021 | Huang | H04W 8/005 |
| 2023/0179294 A1* | 6/2023 | Kuang | H04B 7/18513 370/316 |

FOREIGN PATENT DOCUMENTS

| | | | | |
|---|---|---|---|---|
| CN | 102968051 A | * | 3/2013 | G04R 20/04 |
| CN | 106357354 A | | 1/2017 | |

OTHER PUBLICATIONS

International Search Report and Written Opinion issued Apr. 15, 2021, in PCT/CN2020/102800 (with English Translation), 13 pages.

* cited by examiner

*Primary Examiner* — Hashim S Bhatti
*Assistant Examiner* — Ahmed Saifuddin
(74) *Attorney, Agent, or Firm* — Oblon, McClelland, Maier & Neustadt, L.L.P.

(57) ABSTRACT

A beam receiving method that can include receiving a beam signal in a target area from a network device in a non-terrestrial network, detecting a signal strength of the beam signal, and stopping receiving the beam signal in the target area, in response to determining that the signal strength of the beam signal satisfies a first condition. The first condition can include at least one of: the signal strength decreasing within a first period of time, the signal strength being less than a first strength, or a change rate of the signal strength within the first period of time being greater than a first change rate.

17 Claims, 4 Drawing Sheets

BEAM RECEIVING METHOD AND APPARATUS, ELECTRONIC DEVICE, AND COMPUTER-READABLE STORAGE MEDIUM

CROSS-REFERENCE TO RELATED APPLICATIONS

This application is a national phase application of International Application No. PCT/CN2020/102800, filed Jul. 17, 2020, the entire contents of which are incorporated herein by reference.

BACKGROUND OF THE INVENTION

Field of the Invention

The present disclosure generally relates to the field of communication technologies, and more particularly to a beam receiving method and apparatus, an electronic device and a computer-readable storage medium.

Description of the Related Art

In a non-terrestrial network (NTN for short), a base station and a terminal can communicate through a satellite, and as the satellite is located in the air, a communication area covered by the satellite may be increased. However, a coverage mode of the communication area by the satellite is different from that by the current base station.

For the base station and terminal located on the ground, the base station can send measurement beams to cover the communication area by means of periodic beam scanning, and configuration information of the beam scanning is known to the terminal, so that the terminal can detect the beam for measurement emitted by the base station according to the configuration information. Generally, the base station periodically sends the beam for measurement, and the terminal also periodically detects the measurement beam.

For the satellite, its coverage mode of the communication area is a beam hopping communication mode, that is, the satellite may dynamically turn on or off the beam in a certain area according to the distribution of terminals, services and other conditions, but the terminals do not know whether the satellite will turn on or off the beam. If the satellite has turned off the beam in a certain area, but the terminal still periodically detects the measurement beam in this area, then the terminal will consume power unnecessarily.

SUMMARY OF THE INVENTION

According to a first aspect of embodiments of the present disclosure, there is provided a beam receiving method. The beam receiving method includes receiving a beam signal in a target area from a network device in a non-terrestrial network, detecting a signal strength of the beam signal, and stopping receiving the beam signal in the target area, in response to determining that the signal strength of the beam signal satisfies a first condition. The first condition includes at least one of: the signal strength decreasing within a first period of time, the signal strength being less than a first strength, or a change rate of the signal strength within the first period of time being greater than a first change rate.

According to a second aspect of embodiments of the present disclosure, there is provided an electronic device. The electronic device includes a processor and a memory for storing instructions executable by the processor. The processor is configured to implement the method as described in any embodiment of the first aspect of the present disclosure.

According to a third aspect of embodiments of the present disclosure, there is provided a computer-readable storage medium. The computer-readable storage medium has stored therein computer programs that, when executed by a processor, cause steps of the method as described in any embodiment of the first aspect of the present disclosure to be implemented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
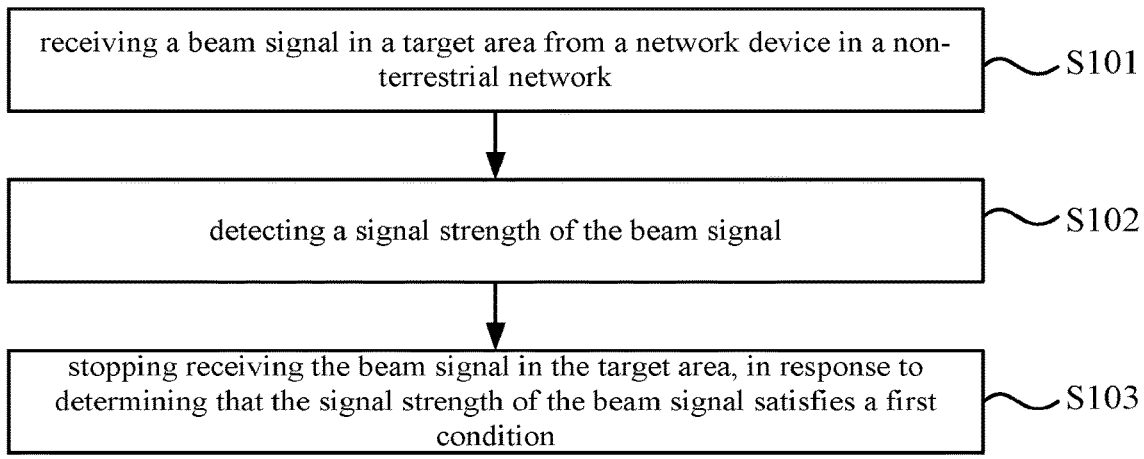
FIG. 1 is a schematic flowchart of a beam receiving method according to embodiments of the present disclosure.

Referring now to the drawings, wherein like reference numerals designate identical or corresponding parts throughout the several views.

Technical solutions in embodiments of the present disclosure will be described clearly and completely below with reference to the accompanying drawings involved in the embodiments of the present disclosure. Apparently, the embodiments described herein are only a part, rather than all of embodiments of the present disclosure. All other embodiments obtainable by those ordinarily skilled in the art based on the embodiments described herein without creative labor shall belong to the scope of the present disclosure.

According to a first aspect of embodiments of the present disclosure, there is provided a beam receiving method. The beam receiving method includes: receiving a beam signal in a target area from a network device in a non-terrestrial network; detecting a signal strength of the beam signal; and stopping receiving the beam signal in the target area, in response to determining that the signal strength of the beam signal satisfies a first condition. The first condition includes at least one of: the signal strength decreasing within a first period of time, the signal strength being less than a first strength, or a change rate of the signal strength within the first period of time being greater than a first change rate.

In an embodiment, the first condition further includes a duration during which the signal strength is less than the first strength being greater than a first duration.

In an embodiment, stopping receiving the beam signal in the target area includes: stopping receiving the beam signal in the target area within a second duration.

In an embodiment, the method further includes receiving the beam signal in the target area from the network device, and/or detecting the signal strength of the beam signal, after the second duration.

In an embodiment, the beam receiving method further includes: receiving the first condition sent by a base station.

According to a second aspect of embodiments of the present disclosure, there is provided a beam receiving apparatus. The beam receiving apparatus includes a first receiving module, a detecting module and a receiving control module. The first receiving module is configured to receive a beam signal in a target area from a network device in a non-terrestrial network. The detecting module is configured to detect a signal strength of the beam signal. The receiving control module is configured to stop receiving the beam signal in the target area, in response to determining that the signal strength of the beam signal satisfies a first condition. The first condition includes at least one of: the signal strength decreasing within a first period of time, the signal strength being less than a first strength, or a change rate of the signal strength within the first period of time being greater than a first change rate.

In an embodiment, the first condition further includes: a duration during which the signal strength is less than the first strength being greater than a first duration.

In an embodiment, the receiving control module is configured to stop receiving the beam signal in the target area within a second duration.

In an embodiment, the first receiving module is further configured to: receive the beam signal in the target area from the network device, and/or detect the signal strength of the beam signal, after the second duration.

In an embodiment, the beam receiving apparatus further includes: a second receiving module, configured to receive the first condition sent by a base station.

According to a third aspect of embodiments of the present disclosure, there is provided an electronic device. The electronic device includes a processor and a memory for storing instructions executable by the processor. The processor is configured to implement the method as described in any embodiment of the first aspect of the present disclosure.

According to a fourth aspect of embodiments of the present disclosure, there is provided a non-transitory computer-readable storage medium. The computer-readable storage medium has stored therein computer programs that, when executed by a processor, cause steps of the method as described in any embodiment of the first aspect of the present disclosure to be implemented.

According to embodiments of the present disclosure, when a terminal detects that the beam signal satisfies the first condition, it can determine that the network device has turned off the beam signal in the target area and stop receiving the beam signal in the target area, thereby avoiding unnecessary power consumption and saving the energy of the terminal.

FIG. 1 is a schematic flowchart of a beam receiving method according to embodiments of the present disclosure. The method shown in these embodiments may be applied to a terminal, and the terminal may be located in a non-terrestrial network. In the non-terrestrial network, the terminal may communicate with a base station through a network device in the air. The network device may be a satellite or an aerial platform. The terminal includes but is not limited to an electronic device such as a mobile phone, a tablet computer, a wearable device, a sensor, an Internet of Things (IoT) device and the like. The base station may be a 5G base station or a 6G base station.

As shown in FIG. 1, the beam receiving method may include the following steps.

In step S101, a beam signal in a target area is received from a network device in a non-terrestrial network.

In step S102, a signal strength of the beam signal is detected.

In step S103, receiving the beam signal in the target area is stopped, in response to determining that the signal strength of the beam signal satisfies a first condition.

The first condition includes at least one of: the signal strength decreasing within a first period of time, the signal strength being less than a first strength, or a change rate of the signal strength within the first period of time being greater than a first change rate.

In an embodiment, for the network device, it can cover a communication area where terminals are located by means of beam hopping communication, and can dynamically turn on or off the beam in a certain area according to distribution of terminals in the communication area, services, and other conditions. In another embodiment, the beam signal in a target area is a beam for measurement send by the network device in a non-terrestrial network to the target area. The beam signal can also be called signal for measurement or beam for measurement.

For a target area in a plurality of communication areas covered by the network device, a terminal in the target area can receive a beam signal in the target area of the network device, detect a signal strength of the beam signal, and further determine whether the network device has turned off the beam in the target area according to whether the signal strength of the beam signal satisfies the first condition. In another embodiment, the network device has turned off the beam in the target area, which can be understood as the beam signal sent by the network device or the beam signal that meets the specific conditions sent by the network device is not received in the target area. The specific conditions include the signal strength is greater than or equal to the first strength.

The signal strength may be characterized based on reference signal information such as reference signal receiving power (RSRP), reference signal receiving quality (RSRQ) and the like.

In an aspect, it may be determined first whether the signal strength decreases within the first period of time. For example, an ending moment of the first period of time may be a current moment, then a signal strength at the current moment and a signal strength at a starting moment of the first period of time may be determined. If the signal strength at the starting moment is greater than the signal strength at the current moment, it may be determined that the signal strength decreases within the first period of time.

Besides the above-mentioned manner for determining whether the signal strength decreases within the first period of time, other manners may also be used to determine whether the signal strength decreases within the first period of time as required. For example, a plurality of sub-time periods are selected from the first period of time, and a change situation of the signal strength in each of the plurality of sub-time periods is determined. If the signal strength decreases within each of the plurality of sub-time periods, it may be determined that the signal strength decreases within the first period of time.

In a case where the signal strength decreases within the first period of time, it indicates that the signal strength of the beam signal in the target area gradually weakens, and it is determined that the network device may have turned off the beam in the target area, but it is not enough to determine whether the network device has turned off the beam in the target area only according to this condition, because the decrease of the signal strength may simply be caused by normal fluctuation of the beam signal.

In another aspect, it is also feasible to determine whether a change rate of the signal strength within the first period of time is greater than the first change rate. For example, the ending moment of the first period of time may be the current moment, then the signal strength at the current moment and the signal strength at the starting moment of the first period of time may be determined. On the basis of determining that the signal strength decreases, a difference between the signal strength at the current moment and the signal strength at the starting moment is calculated, and then a quotient of the difference and the duration of the first period of time is calculated as the change rate of the signal strength within the first period of time.

Further, the change rate of the signal strength may be compared with the first change rate. If the change rate of the signal strength is greater than the first change rate, it is determined that the signal strength within the first period of time is not only weakening, but also rapidly weakening, then generally it does not belong to the normal fluctuation of the beam signal, but a large probability is due to the network device turning off the beam signal in the target area.

In yet another aspect, the signal strength may be compared with the first strength. If the signal strength is less than the first strength, it is determined that the signal strength is too weak, which generally is not caused by the normal fluctuation of the beam signal, but in high probability is caused by the shutoff of the beam signal in the target area by the network device.

When detecting that the beam signal satisfies one or more of the above three aspects of the first condition, the terminal in embodiments of the present disclosure may determine that the network device has turned off the beam signal in the target area, and thus stop receiving the beam signal in the target area (also stop operations like detecting the beam signal and sending a signal), so as to avoid unnecessary power consumption and saving the energy of the terminal.

In an embodiment, after determining that the network device has turned off the beam signal in the target area, the terminal may reduce a frequency of operations such as receiving the beam signal in the target area, detecting the beam signal, and/or sending a signal.

In an embodiment, if the beam signal detected by the terminal does not satisfy the first condition, for example, does not satisfy any of the above three aspects of the first condition, or does not satisfy all of the above three aspects of the first condition, the terminal may continue receiving the beam signal in the target area.

In an embodiment, the first condition further includes a duration during which the signal strength is less than the first strength being greater than a first duration.

In an embodiment, for the signal strength, in addition to the judgments based on the above three aspects, it is also feasible to determine whether the duration during which the signal strength is less than the first strength is greater than the first duration.

In some situations, the beam signal fluctuates frequently, for example, the signal strength of the beam signal fluctuates frequently around the first strength, and a duration during which the signal strength is less than the first strength is very short. In this case, the network device actually does not turn off the beam signal in the target area, but it is still possible to determine that the network device has turned off the beam signal in the target area because it is determined in a short time that the signal strength is less than the first strength, which will lead to a misoperation.

Therefore, in this embodiment, it is determined whether the duration during which the signal strength is less than the first strength is greater than the first duration, and only when the duration during which the signal strength is less than the first strength is greater than the first duration, it is determined that the network device has turned off the beam signal in the target area, so as to ensure the accuracy of the determination result, and then stop receiving the beam signal in the target area, thereby avoiding the misoperation.

Figure 2:
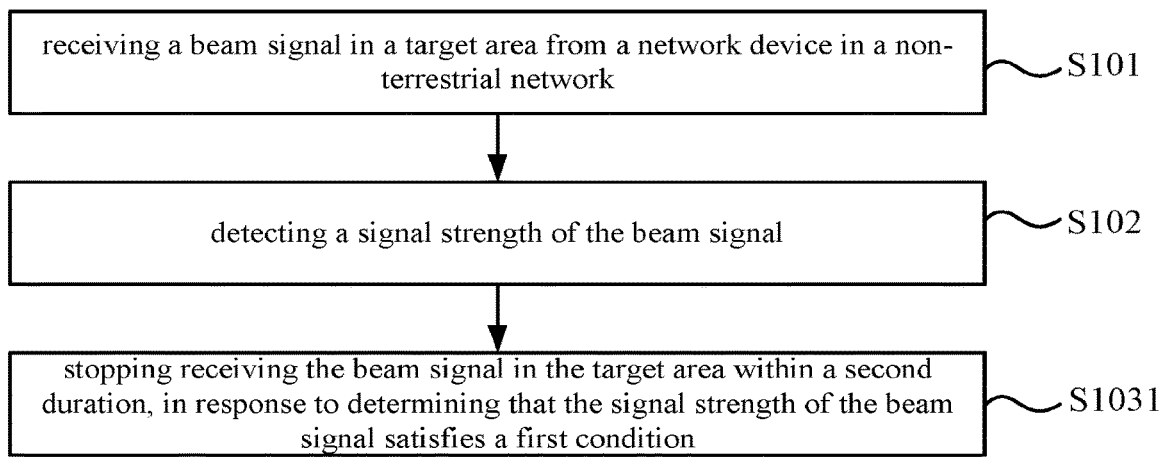
FIG. 2 is a schematic flowchart of a beam receiving method according to embodiments of the present disclosure.

FIG. 2 is a schematic flowchart of a beam receiving method according to embodiments of the present disclosure. As shown in FIG. 2, stopping receiving the beam signal in the target area includes the following step S1031. In step S1031, receiving the beam signal in the target area is stopped within a second duration.

In an embodiment, even if the signal strength of the beam signal satisfies the first condition, and it is determined that the network device has turned off the beam signal in the target area, the network device will not turn off the beam signal in the target area all the time. Generally, after a period of time, the network device will turn on the beam signal in the target area again with the change of the distribution of the terminals, services and other conditions.

Therefore, stopping receiving the beam signal in the target area specifically may be stopping receiving the beam signal in the target area within the second duration, so as to ensure that the beam signal can be received when the network device turns on the beam signal in the target area subsequently. For example, a timer may be set, and the timer is configured to determine a timeout when the second duration is reached, such that the timer is started when the terminal stops receiving the beam signal in the target area, and the terminal continues receiving the beam signal in the target area when the timer times out.

Figure 3:
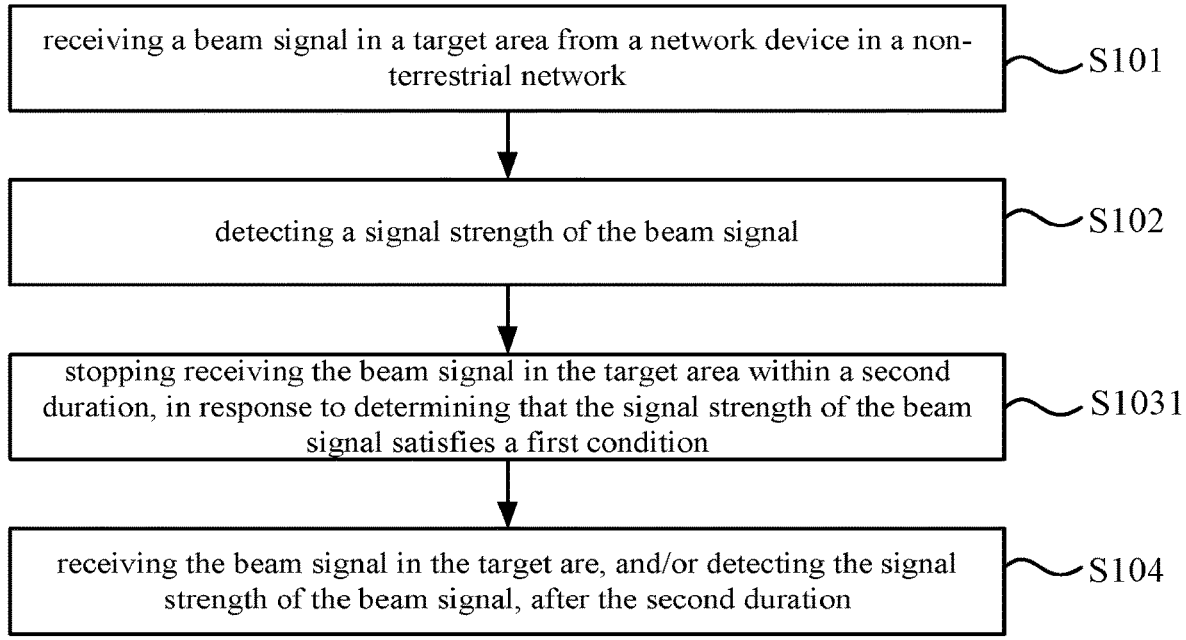
FIG. 3 is a schematic flowchart of a beam receiving method according to embodiments of the present disclosure.

FIG. 3 is a schematic flowchart of a beam receiving method according to embodiments of the present disclosure. As shown in FIG. 3, the method further includes the following step S104.

In step S104, after the second duration, the beam signal in the target area is received, and/or the signal strength of the beam signal is detected. In an embodiment, after the second duration, the beam signal in the target area may be received, and the signal strength of the beam signal may be detected. That is, it can be understood that after the second duration, the step S101 and the step S102 are performed again, so as to ensure that the beam signal can be received when the network device turns on the beam signal in the target area subsequently, and receiving the beam signal in the target area is stopped again when the signal strength of the beam signal does not satisfy the first condition.

Figure 4:
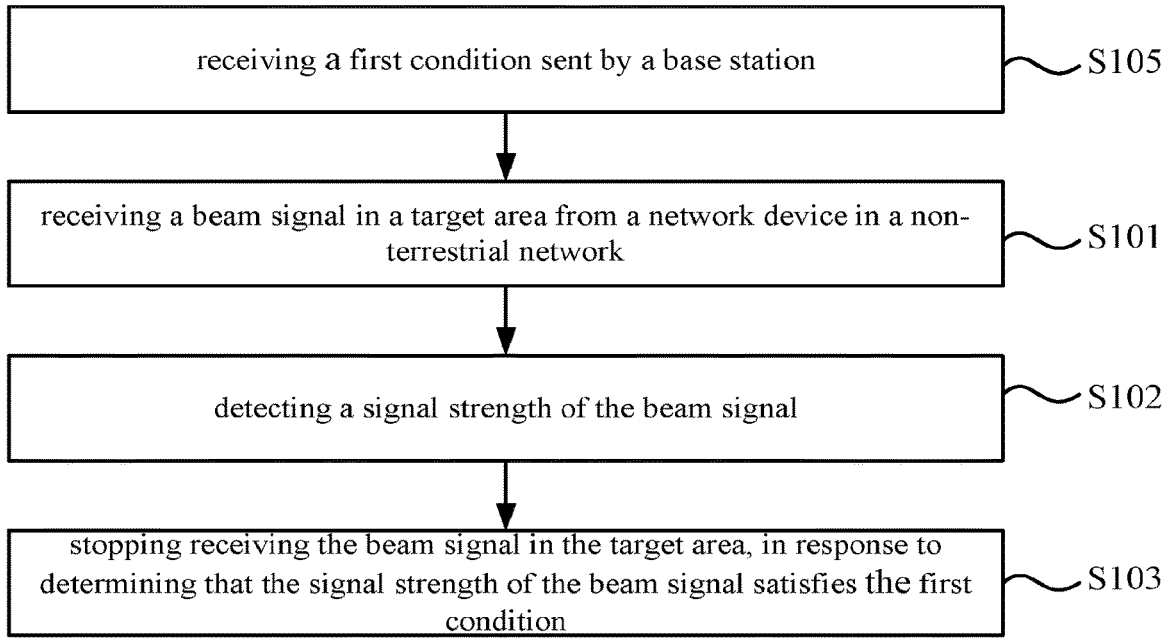
FIG. 4 is a schematic flowchart of a beam receiving method according to embodiments of the present disclosure.

FIG. 4 is a schematic flowchart of a beam receiving method according to embodiments of the present disclosure. As shown in FIG. 4, the method further includes the following step S105.

In step S105, the first condition sent by a base station is received. In an embodiment, the first condition may be sent by the base station to the terminal. In an embodiment, the first condition includes threshold information like the first change rate, the first strength, the first duration and the like. For example, before detecting the signal strength of the beam signal, the base station may specifically send threshold information like the first change rate, the first strength and the first duration as above-mentioned to the terminal, so that the terminal can compare the signal strength of the beam signal with the threshold information, so as to determine whether the signal strength of the beam signal satisfies the first condition.

It should be noted that the first condition may be forwarded to the terminal by the base station through the network device, or may be directly sent by the base station to the terminal. Corresponding to the above embodiments of the beam receiving method, the present disclosure also provides embodiments of a beam receiving apparatus.

Figure 5:
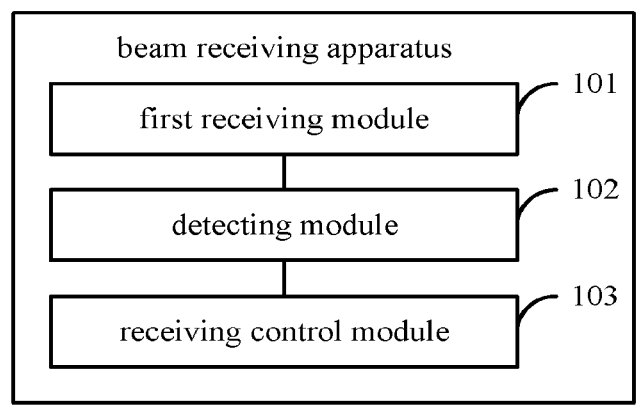
FIG. 5 is a schematic block diagram of a beam receiving apparatus according to embodiments of the present disclosure.

FIG. 5 is a schematic block diagram of a beam receiving apparatus according to embodiments of the present disclosure. The apparatus shown in these embodiments may be applied to a terminal, and the terminal may be located in a non-terrestrial network. In the non-terrestrial network, the terminal may communicate with a base station through a network device in the air. The network device may be a satellite or an aerial platform. The terminal includes but is not limited to an electronic device such as a mobile phone, a tablet computer, a wearable device, a sensor, an Internet of Things (IoT) device and the like. The base station may be a 5G base station or a 6G base station.

As shown in FIG. 5, The beam receiving apparatus may include: a first receiving module 101, a detecting module 102 and a receiving control module 103.

The first receiving module 101 is configured to receive a beam signal in a target area from a network device in a non-terrestrial network.

The detecting module 102 is configured to detect a signal strength of the beam signal.

The receiving control module 103 is configured to stop receiving the beam signal in the target area, in response to determining that the signal strength of the beam signal satisfies a first condition.

The first condition includes at least one of: the signal strength decreasing within a first period of time, the signal strength being less than a first strength, or a change rate of the signal strength within the first period of time being greater than a first change rate.

In an embodiment, the first condition further includes: a duration during which the signal strength is less than the first strength being greater than a first duration.

In an embodiment, the receiving control module is configured to stop receiving the beam signal in the target area within a second duration.

In an embodiment, the first receiving module is further configured to: receive the beam signal in the target area from the network device, and/or detect the signal strength of the beam signal, after the second duration.

Figure 6:
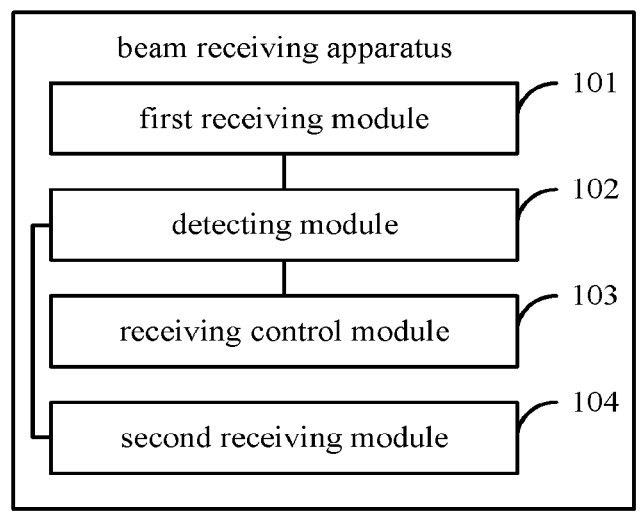
FIG. 6 is a schematic block diagram of a beam receiving apparatus according to embodiments of the present disclosure.

FIG. 6 is a schematic block diagram of a beam receiving apparatus according to embodiments of the present disclosure. As shown in FIG. 6, the beam receiving apparatus further includes a second receiving module 104. The second receiving module 104 is configured to receive the first condition sent by a base station.

Regarding the apparatus as described in the foregoing embodiments, the specific manners in which each module performs the operation have been described in detail in embodiments of the related methods, which will not be elaborated here.

For the apparatus embodiments, since they basically correspond to the method embodiments, for relevant parts, reference can be made to the descriptions in the method embodiments. The apparatus embodiments described above are only illustrative, the modules described therein as separate components may or may not be physically separated, and components shown as modules may or may not be physical modules, that is, they may be located in one place, or they may be distributed over a plurality of network modules. Some or all of the modules may be selected according to actual needs to achieve the purpose of the solutions in embodiments of the present disclosure. These embodiments can be understood and implemented by those ordinarily skilled in the art without creative labor.

Embodiments of the present disclosure further provide an electronic device. The electronic device includes a processor and a memory for storing instructions executable by the processor. The processor is configured to implement the method as described in any embodiment above.

Embodiments of the present disclosure further provide a non-transitory computer-readable storage medium. The computer-readable storage medium has stored therein computer programs that, when executed by a processor, cause steps of the method as described in any embodiment above to be implemented.

Figure 7:
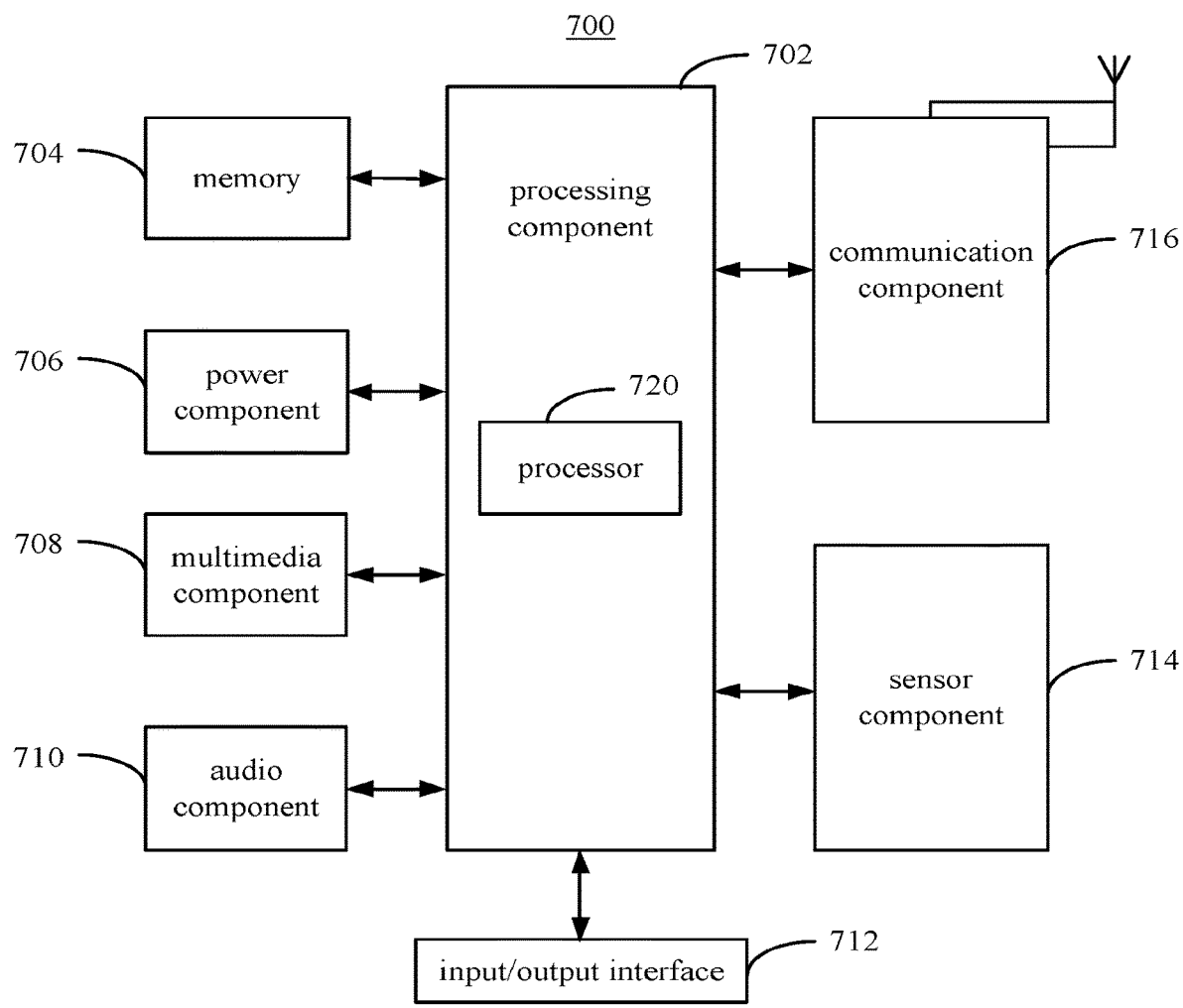
FIG. 7 is a schematic block diagram of an apparatus for receiving a beam according to embodiments of the present disclosure.

FIG. 7 is a schematic block diagram of an apparatus 700 for receiving a beam according to embodiments of the present disclosure. For example, the apparatus 700 may be a mobile phone, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, 3G, 4G long term evolution (LTE), 5G new radio (NR) or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 704 including instructions. The instructions are executable by the processor 720 in the apparatus 700 for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It should be noted that, relational terms used herein, such as first, second and the like, are only used to distinguish one entity or operation from another entity or operation, and do not necessarily require or imply the actual presence of any such relationship or sequence between these entities or operations. The terms "comprising", "including" or any other variations thereof are intended to cover non-exclusive inclusions, such that a process, method, article or device including a list of elements includes not only those elements, but also other elements not expressly listed or elements inherent to such a process, method, article or device. Without further restrictions, an element defined by a statement "including a/an . . . " does not preclude the presence of additional identical elements in the process, method, article or device that includes the element.

The methods and apparatuses provided by embodiments of the present disclosure have been described in detail above. Specific examples are used herein to illustrate the principles and implementations of the present disclosure, and the above description of the examples is only used to help understand the methods and core ideas of the present disclosure, and changes in specific implementations and application scopes can be made by those ordinarily skilled in the art according to the idea of the present disclosure. In summary, the contents of this specification should not be construed as a limitation to the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A beam receiving method, executed by a terminal, comprising:
   receiving a beam signal in a target area from a network device in a non-terrestrial network;
   detecting a signal strength of the beam signal; and
   stopping receiving the beam signal in the target area, in response to determining that the signal strength of the beam signal satisfies a first condition,
   wherein the first condition comprises at least one of:
   the signal strength decreasing within a first period of time, the signal strength being less than a first strength, or
   a change rate of the signal strength within the first period of time being greater than a first change rate,
   wherein the first condition further comprises:
   a time duration in which the signal strength is less than the first strength being greater than a first time duration.

2. The method according to claim 1, wherein stopping receiving the beam signal in the target area comprises:
   stopping receiving the beam signal in the target area within a second duration.

3. The method according to claim 2, further comprising:
   receiving the beam signal in the target area from the network device, after the second duration.

4. The method according to claim 3, further comprising:
   detecting the signal strength of the beam signal, after the second duration.

5. The method according to claim 2, further comprising:
   detecting the signal strength of the beam signal, after the second duration.

6. The method according to claim 1, further comprising:
   receiving the first condition sent by a base station.

7. The method according to claim 6, wherein receiving the first condition sent by the base station comprises:
   receiving the first condition forwarded by the network device from the base station; or
   receiving the first condition from the base station directly.

8. The method according to claim 1, wherein the network device is a satellite or an aerial platform.

9. An electronic device, comprising:
   a processor; and
   a memory for storing instructions executable by the processor;
   wherein the processor is configured to implement a beam receiving method, comprising: receiving a beam signal in a target area from a network device in a non-terrestrial network;
   detecting a signal strength of the beam signal; and
   stopping receiving the beam signal in the target area, in response to determining that the signal strength of the beam signal satisfies a first condition,
   wherein the first condition comprises at least one of:
   the signal strength decreasing within a first period of time, the signal strength being less than a first strength, or
   a change rate of the signal strength within the first period of time being greater than a first change rate,
   wherein the first condition further comprises:
   a time duration in which the signal strength is less than the first strength being greater than a first time duration.

10. The electronic device according to claim 9, wherein stopping receiving the beam signal in the target area comprises:
    stopping receiving the beam signal in the target area within a second duration.

11. The electronic device according to claim 10, wherein the method further comprises at least one of:
    receiving the beam signal in the target area from the network device after the second duration, or
    detecting the signal strength of the beam signal after the second duration.

12. The electronic device according to claim 9, wherein the method further comprises:
    receiving the first condition sent by a base station.

13. A computer-readable storage medium having stored therein computer programs that, when executed by a processor, cause a beam receiving method to be implemented, the method comprising:
    receiving a beam signal in a target area from a network device in a non-terrestrial network;
    detecting a signal strength of the beam signal; and
    stopping receiving the beam signal in the target area, in response to determining that the signal strength of the beam signal satisfies a first condition,
    wherein the first condition comprises at least one of:
    the signal strength decreasing within a first period of time, the signal strength being less than a first strength, or
    a change rate of the signal strength within the first period of time being greater than a first change rate,
    wherein the first condition further comprises:
    a time duration in which the signal strength is less than the first strength being greater than a first time duration.

14. The computer-readable storage medium according to claim 13, wherein stopping receiving the beam signal in the target area comprises:
    stopping receiving the beam signal in the target area within a second duration.

15. The computer-readable storage medium according to claim 14, wherein the method further comprises at least one of:
    receiving the beam signal in the target area from the network device after the second duration, or
    detecting the signal strength of the beam signal after the second duration.

16. The computer-readable storage medium according to claim 13, wherein the method further comprises:
    receiving the first condition sent by a base station.

17. The method according to claim 1, further comprising:
    receiving the first condition sent by a base station.

* * * * *